United States Patent [19] | [11] 4,120,321
O'Neil | [45] Oct. 17, 1978

[54] TIMING DEVICE FOR A FLUID SIGNAL AND FLUID ACTUATOR THEREFOR

[75] Inventor: Charles P. O'Neil, Milwaukee, Wis.

[73] Assignee: Amerace Corporation, New York, N.Y.

[21] Appl. No.: 755,471

[22] Filed: Dec. 29, 1976

[51] Int. Cl.[2] ..................... F16K 31/165

[52] U.S. Cl. ..................... 137/271; 137/624.11; 251/73

[58] Field of Search ..................... 137/624.11, 624.14, 137/82, 269, 271; 251/73

[56] References Cited

U.S. PATENT DOCUMENTS

| | | | |
|---|---|---|---|
| 2,984,216 | 5/1961 | Greenlees | 137/85 X |
| 3,931,832 | 1/1976 | Hodler | 137/624.11 |
| 4,018,249 | 4/1977 | Lameyre | 137/624.11 |

*Primary Examiner*—Alan Cohan
*Attorney, Agent, or Firm*—S. Michael Bender; Ken Richardson

[57] ABSTRACT

A timing device includes a timing means which effects movement of a motion transmitting member at a selected rate to establish a timed interval of selected duration, upon expiration of which interval a fluid signal is provided at a given point in a fluid circuit. The timing device is actuated by a fluid actuator which utilizes diaphragms with flexible portions to eliminate dynamic seals. Means is provided for enabling actuation of the timing device in response to a relatively short-term activating pulse.

41 Claims, 7 Drawing Figures

TIMING DEVICE FOR A FLUID SIGNAL AND FLUID ACTUATOR THEREFOR

The present invention relates generally to timing devices and pertains, more specifically, to a time-delay device in which a fluid signal is provided in a fluid circuit after the lapse of a predetermined time interval following actuation of the device by a relay or some like actuating apparatus. The fluid signal can be utilized in a logic system to provide a pilot signal after a preset time-delay or to operate a control valve directly to switch substantial fluid loads after a given time delay.

A variety of time-delay control apparatus is currently available in which a timing device is operated by an actuator to provide a timed interval between actuation of the timing device and the occurrence of some desired event, such as the operation of an electric switch. Among the most widely accepted of such control apparatus are those which employ a pneumatic timing device together with a solenoid actuator so that the timed interval can be measured either from activation or deactivation of the solenoid.

In certain environments, such as in the control of the flow of flammable fluids, and especially combustible gases, time-delay control apparatus is employed to open or close flow control valves. For example, fluid circuits for pilot flames in gas-burning systems are controlled by time-delay apparatus so that the fluid circuits are opened or closed after a time-delay interval measured from the occurrence of a given event, such as an interruption in gas flow. In such environments, the employment of electrical devices may present a hazard and it would be advantageous to have available a time-delay device which does not rely upon electrical components for its operation.

Pneumatic timing mechanisms which provide accurately measured intervals for time-delay purposes without the use of electrical components are especially well-suited for use in environments where electrical components are unnecessary, undesirable or dangerous. The utilization of such pneumatic timing mechanisms for the control of fluids requires a reliable control system which is easily operated by a pneumatic timing mechanism to provide positive operation of a fluid circuit between open and closed conditions with no deleterious effect upon the functioning of the timing mechanism.

A timing device in which a valve is operated by a time-delay mechanism to open or close a fluid circuit upon the lapse of a predetermined timed interval following actuation of the device is disclosed in an earlier application, Ser. No. 658,773, filed Feb. 17, 1976, now U.S. Pat. No. 4,068,682 and assigned to the assignee of the instant application. It is an object of the present invention to provide a timing device in which a fluid signal in a fluid control circuit is switched at the expiration of a time delay interval for control purposes, in response to the operation of the time-delay mechanism, rather than having the time-delay mechanism itself directly operate a valve or other component in the main fluid circuit. The fluid signal can then be utilized in a logic system to provide a pilot signal or to operate a control valve to switch substantial fluid loads, after a selected time delay.

Another object of the invention is to provide a timing device of the type described which is small, compact and capable of reliable operation with minimal actuating forces.

Still another object of the invention is to provide a fluid actuator for a timing device of the type described, the fluid actuator utilizing a diaphragm construction employing a flexible portion to eliminate a dynamic seal, and concomitant frictional resistance forces between component parts of the fluid actuator, which frictional forces can lead to loss of sensitivity and increased mechanical wear.

A further object of the invetion is to provide a fluid actuator for a timing device of the type described, the fluid actuator having a piston, chamber and diaphragm arrangement enabling selective rearrangement and replacement of the component parts to obtain the time-delay interval after either activation or deactivation of the timing device actuator.

A still further object of the invention is to provide a timing device which will operate in response to a short-term pulse input, as opposed to a continuous, long-term activating input.

Another object of the invention is to provide a timing device of the type described which utilizes a known and reliable timing mechanism coupled with a simplified, reliable fluid switching device to obtain a compact, reliable arrangement for providing a fluid signal at the expiration of a time-delay interval of selected duration.

The above objects, as well as still further objects and advantages, are attained by the invention, which may be described briefly as an improvement in a timing device for providing a fluid signal at a given point upon the expiration of a prescribed timed interval following a given event, the timing device including a frame, a motion transmitting member mounted in the frame for movement along a prescribed path of travel in either one of two directions between a first location and a second location, and timing means on the frame coupled with the motion transmitting member for effecting movement of the motion transmitting member at a predetermined rate in one only of the two directions to establish the timed interval between the departure of the motion transmitting member from the first location thereof and the arrival of the motion transmitting member at the second location, and permitting return movement of the motion transmitting member from the second location to the first location at an unrestricted rate, the improvement comprising a fluid switching device on the frame, the switching device having an input passage for a fluid input, a output passage communicating with the given point, a control passage communicating with the input and output passages, and switching means on the frame for operation beween a first condition wherein the control passage is effective to divert the fluid input provided at the input passage away from the output passage, and a second condition wherein the control passage enables the fluid input to be directed to the output passage, the switching means being responsive to the motion transmitting member for operation from one to the other of the first and second conditions upon the arrival of the motion transmitting member at the second location thereof to provide a fluid signal at the given point. The timing device may be actuated by a fluid actuator which utilizes diaphragms with flexible portions to eliminate dynamic seals. Means may be provided for enabling actuation of the timing device in response to a relatively short-term activating pulse.

The invention will be more fully understood, while still further objects and advantages will become apparent, in the following detailed description of preferred embodiments thereof illustrated in the accompanying drawing, in which.

Figure 1:
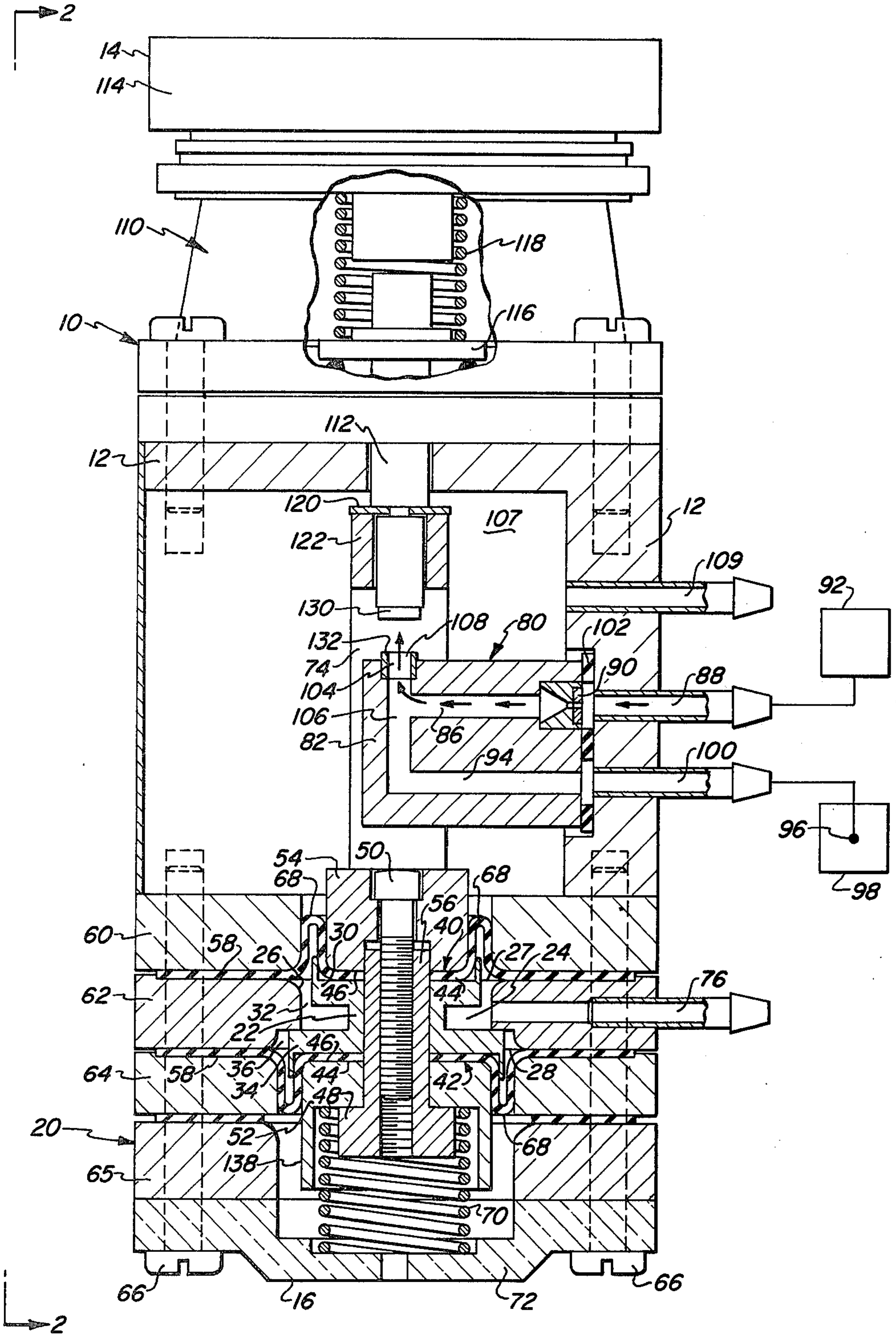
FIG. 1 is a front elevational view of a timing device constructed in accordance with the invention, with portions broken away to reveal operating component parts thereof and a diagrammatic illustration of the environment in which the timing device is installed.
Figure 2:
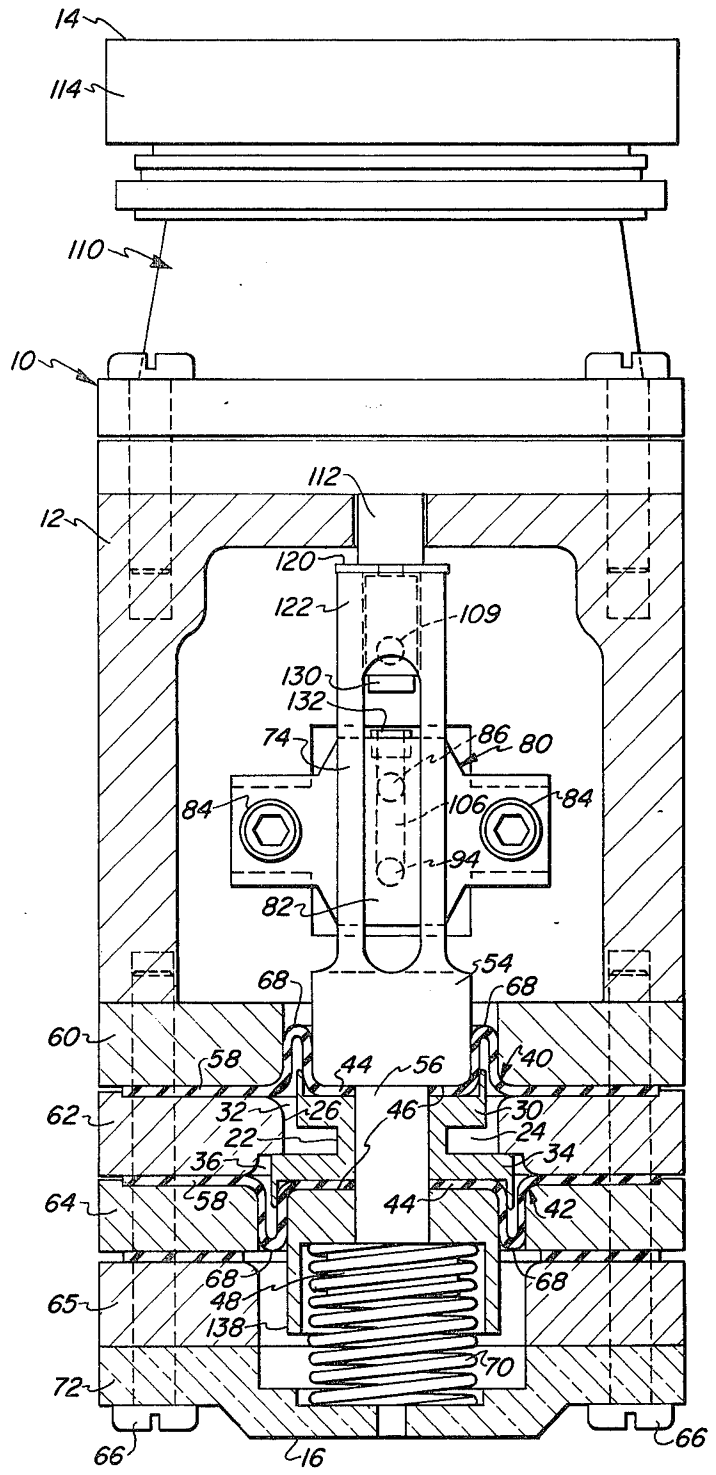
FIG. 2 is a side elevational view of the timing device, viewed in the direction of the arrows in FIG. 1.

Referring now to the drawing, and especially to FIGS. 1 and 2 thereof, a timing device constructed in accordance with the invention is illustrated at 10. Timing device 10 has a frame 12 extending longitudinally between an upper end 14 and a lower end 16 of the device.

Actuating means is shown in the form of a fluid actuator 20 at the lower end 16 of the timing device 10. Actuator 20 includes a piston 22 placed in a chamber 24 for reciprocating movement in longitudinally upward and downward directions. Chamber 24 has a cylindrical wall 26 extending between longitudinally opposite ends 27 and 28 of the chamber. Piston 22 has a first annular portion 30 spaced laterally from wall 26 at annular gap 32. A second annular portion 34 of piston 22 is spaced from wall 26 at annular gap 36.

Chamber 24 is sealed at the upper end 27 thereof by a diaphragm 40 which extends laterally between the annular portion 30 of piston 22 and wall 26 to span the gap 32. Likewise, the lower end 28 is sealed by a diaphragm 42 which extends laterally between the annular portion 34 and wall 26 to span the gap 36. The inner portion 44 of each diaphragm is secured between a corresponding end of the piston 22 and a juxtaposed retaining shoulder 46 by means of a threaded fastener system which includes a sleeve nut 48 threaded onto a bolt 50 so as to draw together a lower retainer 52, piston 22, and an upper retainer 54, all of which are held in longitudinal alignment by the sleeve 56 of sleeve nut 48. The outer portion 58 of each diaphragm is secured in place between appropriate adjacent modular segments 60, 62 and 64 of the frame 12, these segments, together with segment 65, being fastened together with screws 66.

Diaphragms 40 and 42 each have a flexible portion 68 in the form of a salient extending longitudinally between a retainer and an adjacent segment. Thus, upper diaphragm 40 has a flexible portion 68 projecting upwardly between upper retainer 54 and segment 60, while lower diaphragm 42 has a flexible portion 68 projecting downwardly between lower retainer 52 and segment 64.

Piston 22 is biased upwardly by resilient biasing means in the form of a helical spring 70 which extends between lower retainer 52 and the base 72 of frame 12. Upper retainer 54 is integral with an actuator member in the form of a slide 74 which extends longitudinally upwardly for movement with the piston 22. An inlet port 76 is provided for admitting a working fluid to the chamber 24. The configuration of the piston 22 and chamber wall 26 is such that the lateral cross-sectional area of chamber 24 at the lower end 28 of the chamber is larger than the lateral cross-sectional area of the chamber 24 at the upper end 27 of the chamber and the total area of piston portion 34 and the intermediate portion of diaphragm 42 extending between the piston and the chamber wall acted upon by the working fluid admitted to chamber 24 is greater than the total area of piston portion 30 and the portion of diaphragm 40 extending between the piston and the chamber wall acted upon by the working fluid in the chamber; hence, piston 22 will be urged downwardly, in response to fluid under pressure in chamber 24, against the bias of spring 70.

The employment of diaphragms 40 and 42 to seal the gap between piston 22 and the wall 26 at each end of chamber 24 eliminates the need for dynamic seals between the moving and stationary components of the fluid actuator 20, thus reducing frictional resistance forces and any possible loss of working fluid through wear and leakage. The longitudinally extending salient-shaped flexible portion 68 of each diaphragm 40 and 42 assures that movement of the piston 22 is accompanied by a rolling movement of the flexible portion 68, thus reducing the magnitude of the forces necessary to move piston 22. Hence, actuator 20 is capable of activation by working fluid which need not be supplied under very high pressure, and is sensitive enough to be operated by working fluid supplied at lower pressures.

Figure 3:
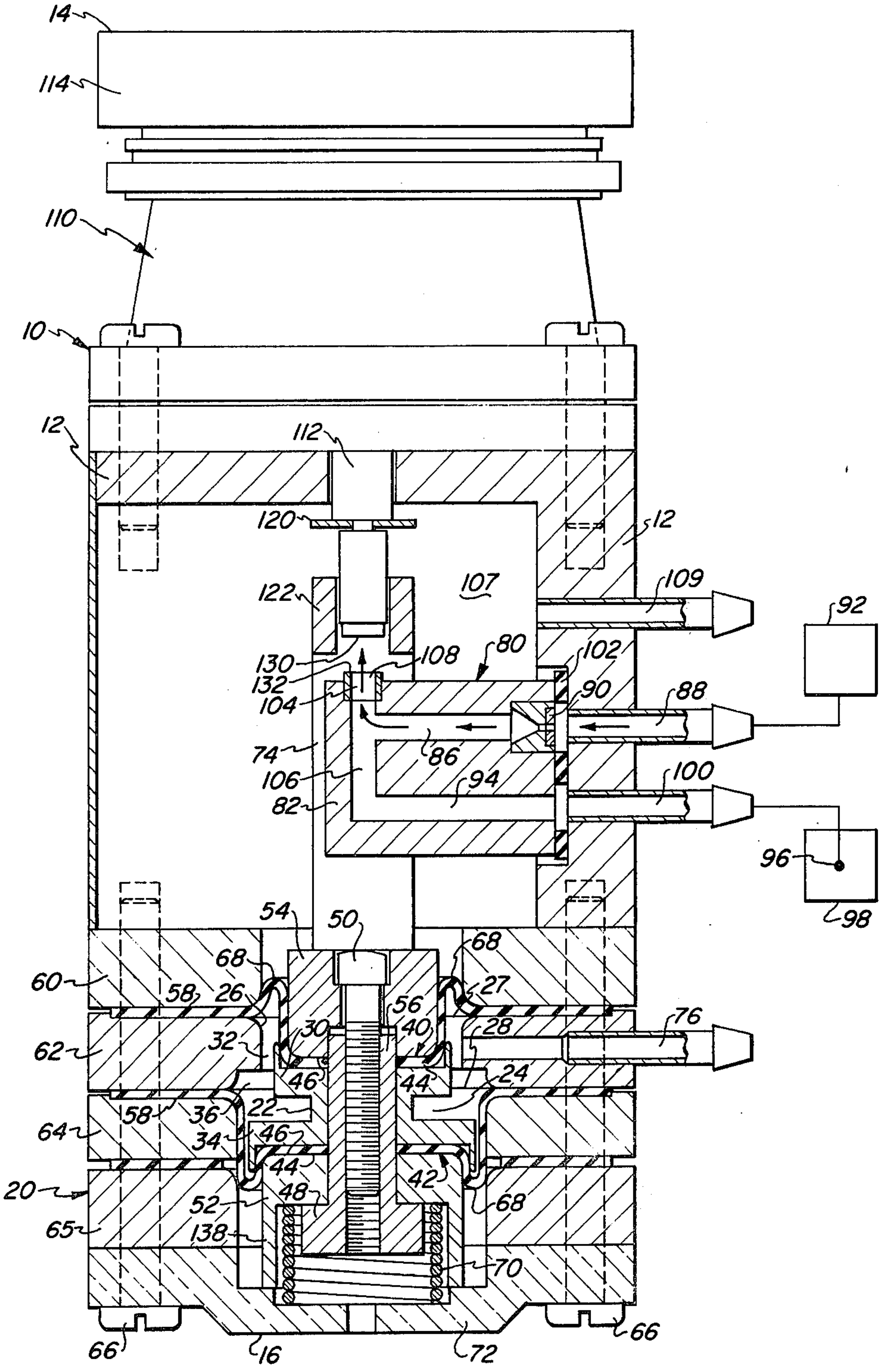
FIG. 3 is a front elevational view similar to FIG. 1, but with the component parts in a different operating position.
Figure 4:
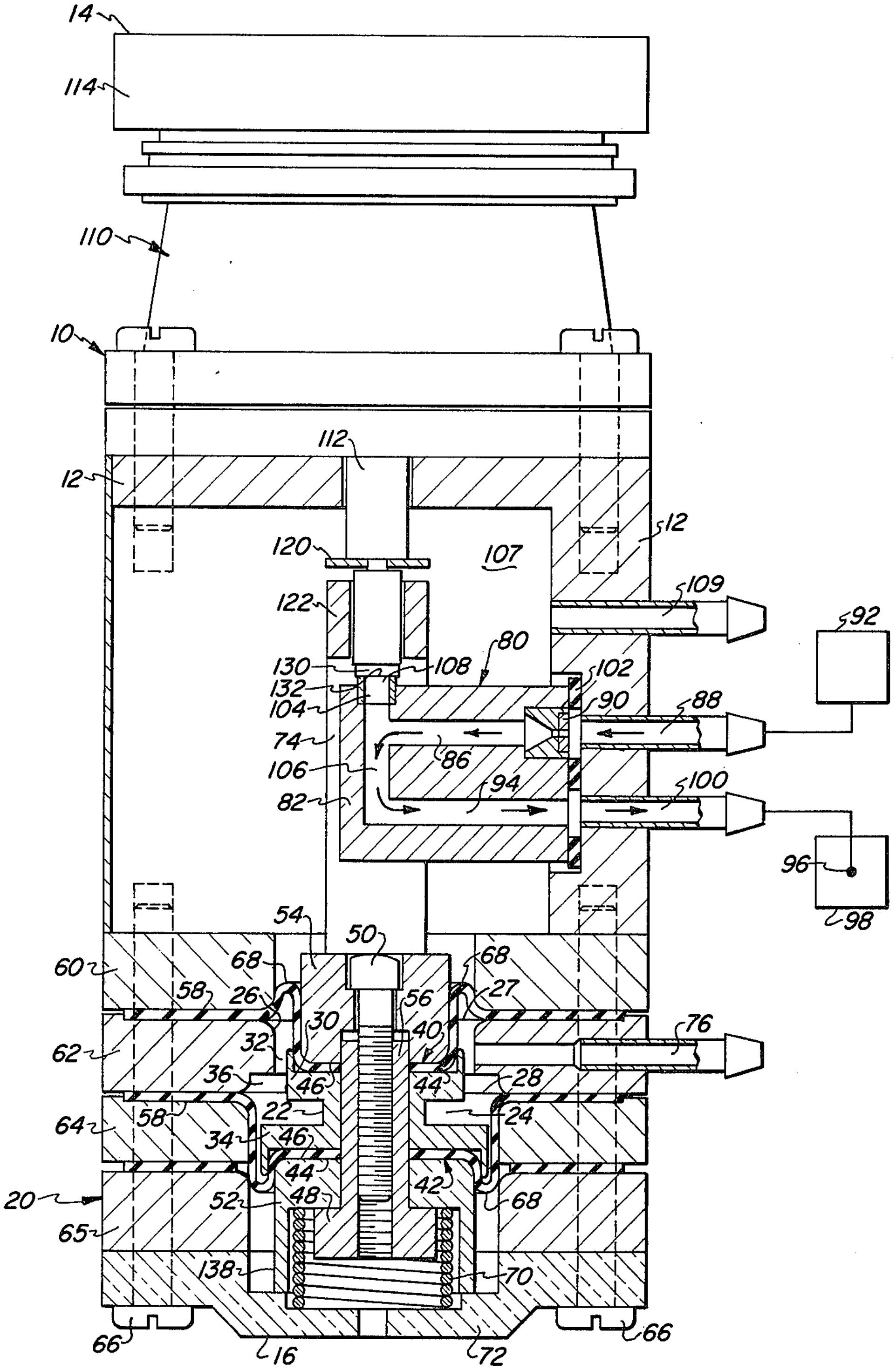
FIG. 4 is a front elevational view similar to FIGS. 1 and 2, but with the component parts in a still different operating position.

In the configuration illustrated in FIGS. 1 to 4, timing device 10 is to operate a fluid switching device for providing a fluid signal at a given point after the lapse of a predetermined interval of time following activation of actuator 20 to move piston 22 from the upper, or rest position, seen in FIGS. 1 and 2, to the lower, or activated, position seen in FIGS. 3 and 4.

The fluid switching device is shown at 80 and has a block 82 affixed to frame 12 by means of screws 84 (see FIG. 2). An input passage 86 in block 82 communicates with an inlet conduit through a jeweled orifice 90 which allows only a carefully metered flow of fluid from a fluid source 92 to pass into input passage 86. In this instance the fluid is air. An output passage 94 communicates with the given point 96 in a fluid control circuit 98 through an outlet conduit 100 in frame 12. A seal 102 seals the juncture of block 82 and the frame 12.

A control passage 104 in block 82 communicates with input passage 86 and output passage 94 through a common passage 106 and includes a control port 108. In the condition shown in FIGS. 1 and 2, control port 108 is open and serves as a vent port. Thus, fluid from source 92 is metered, enters input passage 86 and is vented at control port 108, as indicated by the arrows in FIG. 1, to be diverted away from output passage 94 and into a cavity 107 within the frame 12 of the device 10, cavity 107 itself being vented through an external vent passage 109.

Timing device 10 employs a time-delay mechanism, shown in the form of a pneumatic timing mechanism 110 at the upper end 14 of device 10. Timing mechanism 110 is of a type well-known in the art. Similar pneumatic timing mechanisms are described and illustrated in U.S. Pat. No. 3,599,131, issued on Aug. 10, 1971, to Flanagan et al. A motion transmitting member in the form of a spindle 112 extends downwardly from timing mechanism 110 and it is the function of the timing mechanism to move spindle 112 from an uppermost location, as seen in FIGS. 1 and 2, to a lowermost location, as seen in FIG. 4, at a timed rate of movement so that the elapsed time during such movement of spindle 112 corresponds to a selected time-delay interval. The duration of the interval is selected by setting a dial 114 at the top of the timing mechanism 110.

Spindle 112 is affixed adjacent its upper end to a collar 116, which is a part of the timing mechanism 110. A helical timing spring 118 biases the collar 116 and spindle 112 downwardly. The pneumatic arrangement in timing mechanism 110 enables downward movement of collar 116 and, consequently, spindle 112, from the uppermost location at a selected rate, while permitting upward movement to the uppermost location, against the bias of spring 118, at an unrestricted rate. Adjacent its lower end, spindle 112 is coupled to slide 74 by means of a collar 120 carried by the spindle 112 and a sleeve 122 integral with the slide 74. In the position of the component parts illustrated in FIGS. 1 and 2, the upward biasing force of spring 70 upon piston 22 maintains the piston 22 and slide 74 in the upward position and holds spindle 112 in the uppermost location, against the downward bias of timing spring 118, by virtue of the engagement of sleeve 122 with collar 120.

Upon activation of timing device 10, fluid (in this instance air) is introduced into chamber 24 of actuator 20 through inlet port 76 under pressure so as to lower piston 22 against the bias of spring 70 and thereby actuate slide 74 to move the slide to a lowermost position, as illustrated in FIG. 3. Such downward movement of slide 74 takes place almost instantaneously and frees the spindle 112 for downward movement in response to the downward bias of timing spring 118, at a predetermined rate, the collar 120 now being able to move downwardly, unrestricted by sleeve 122 on slide 74.

As best seen in FIGS. 3 and 4, as spindle 112 moves downwardly, a member in the form of a seal 130 carried at the lower end of spindle 112 also moves downwardly along a linear path of travel from the uppermost position, seen in FIG. 3, to a lowermost position, seen in FIG. 4. At the expiration of the predetermined time-delay interval, seal 130 serves to close off control port 108 so that control passage 104 is no longer effective to divert the fluid input at input passage 86 away from output passage 94 and the fluid input is switched to the output passage 94, as illustrated by the arrows in FIG. 4, to provide a fluid signal at given point 96. The transfer of the fluid input occurs sharply and always at the same location of the spindle 112 and seal 130, even after a relatively long time-delay, thus providing a control signal which is accurately timed relative to activation of the actuator 20. In the illustrated embodiment, seal 130 is seated upon a seat 132 to seal the control port 108 against the bleed of fluid through the control port when the spindle is in the lowermost location. Upon discontinuance of the bleed through control port 108, a change in pressure in the output passage 94 provides a fluid signal at given point 96. The fluid signal at given point 96 operates fluid control circuit 98 for performing a desired function after a selected time delay.

Upon deactivation of timing device 10, the working fluid in chamber 24 is released to permit the piston 22 to move upwardly, under the biasing force of spring 70, thereby moving slide 74 upwardly until sleeve 122 engages collar 120 on spindle 112 to push spindle 112 upwardly until the component parts return to the initial position illustrated in FIGS. 1 and 2. Since the timing mechanism 110 does not impede upward movement of spindle 112, such movement can occur rapidly. The rapid upward movement of spindle 112 moves seal 130 upwardly off seat 132 and opens control port 108 to again divert the fluid input away from output passage 94, thereby altering the fluid signal at given point 96.

In order to provide a ready visual indication of the state of activation or deactivation of actuator 20, base 72 is constructed of a transparent material and lower retainer 52, and especially skirt 138 thereof, is colored with a highly visible material, such as a fluorescent or a phosphorescent material. Thus, the postion of piston 22 in chamber 24 is readily ascertained by viewing the position of lower retainer 52. When activating working fluid is present in chamber 24, the lowered postion of lower retainer 52, with skirt 138 abutting base 72, is easily seen. When no activating working fluid is present in chamber 24, the raised position of lower retainer 52, and skirt 138, can be viewed. Thus, a quick glance at the device is all that is necessary to determine the state of activation or deactivation.

Figure 5:
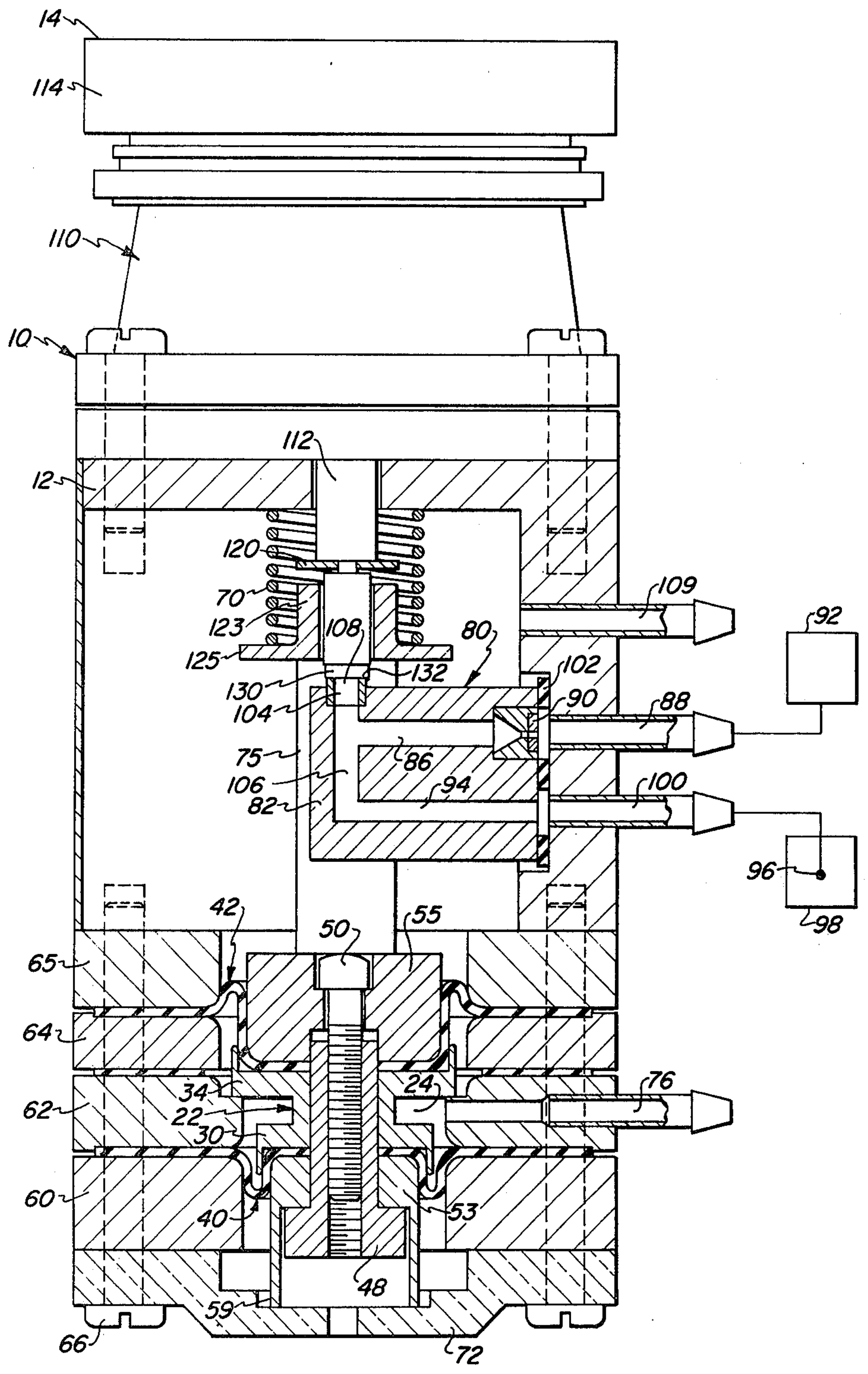
FIG. 5 is a partially sectioned front elevational view of the timing device with certain component parts rearranged or replaced for an alternate mode of operation.

Referring now to FIG. 5, as well as to FIGS. 1 through 4, where it is desired to switch the fluid signal at given point 96 upon the expiration of an interval of time measured from the deactivation of timing device 10, rather than from activation of the device 10 as described above, certain component parts of the device are rearranged or replaced, as follows. Referring first to the device as illustrated in FIGS. 1 through 4, screws 66 are removed to enable removal of base 72 to gain access to spring 70. At the same time, segments 60, 62, 64 and 65 are disassembled to release diaphragms 40 and 42 from frame 12. Removal of base 72 and spring 70 gains access to sleeve nut 48 which is then released from bolt 50 to enable removal of lower retainer 52 and piston 22. Upper retainer 54, together with the integral slide 74 and sleeve 122 are also removed.

Turning now to the device as illustrated in FIG. 5, piston 22 and a replacement lower retainer 53 are reassembled with a replacement upper retainer 55, and with diaphragms 40 and 42 in reversed relative location, by replacing sleeve nut 48 on bolt 50. Piston 22 is installed in an inverted orientation, relative to the orientation shown in FIGS. 1 through 4. New slide 75 is integral with upper retainer 55 and includes a sleeve 123 wth a shoulder 125. Spring 70 is placed between the shoulder 125 and frame 12. Segments 60, 62, 64 and 65 are replaced with the positions of the segments reversed and with segments 60, 62 and 65 in inverted orientation, relative to the position and orientation of the parts in FIGS. 1 through 4. Such reversal and replacement of the modular segments which make up the chamber wall serves to reverse the relative location of the larger and smaller lateral cross-sectional areas at the ends of the chamber 24 so that the lateral cross-sectional area of the chamber 24 at the upper end is larger than the lateral cross-sectional area at the lower end. Screws 66 are passed through base 72 and segments 60, 62, 64 and 65 to secure the component parts to the frame 12.

In the rest position illustrated in FIG. 5, spring 70 biases the slide 75 and piston 22 downwardly so that the depending skirt 59 rests upon base 72. Upon activation of timing device 10, working fluid under pressure is introduced into chamber 24 through inlet port 76 to raise piston 22, and slide 75, against the downward biasing force of spring 70. Sleeve 123 will then engage collar 120 on spindle 112 and will push the spindle 112 upwardly until the timing mechanism 110 is in the reset position (illustrated in FIG. 1). It is noted that the orientation and relative location of piston 22 and segments 60, 62, 64 and 65 enables the working fluid in chamber 24 to move the piston upwardly, rather than downwardly, as in the earlier-described arrangement of FIGS. 1 to 4.

Upon deactivation of timing device 10; that is, upon release of the working fluid from chamber 24, spring 70 immediately will move piston 22 to the lowermost position of the piston, releasing the spindle 112 and enabling the timing mechanism 110 to operate so as to move spindle 112 downwardly toward the lowermost location thereof where seal 130 is seated on seat 132 to close control port 108 and switch the fluid signal as described hereinabove. Hence, fluid switching device 80 is operated to switch the fluid signal at given point 96 following the expiration of a predetermined timed interval measured from deactivation of the timing device 10.

Figure 6:
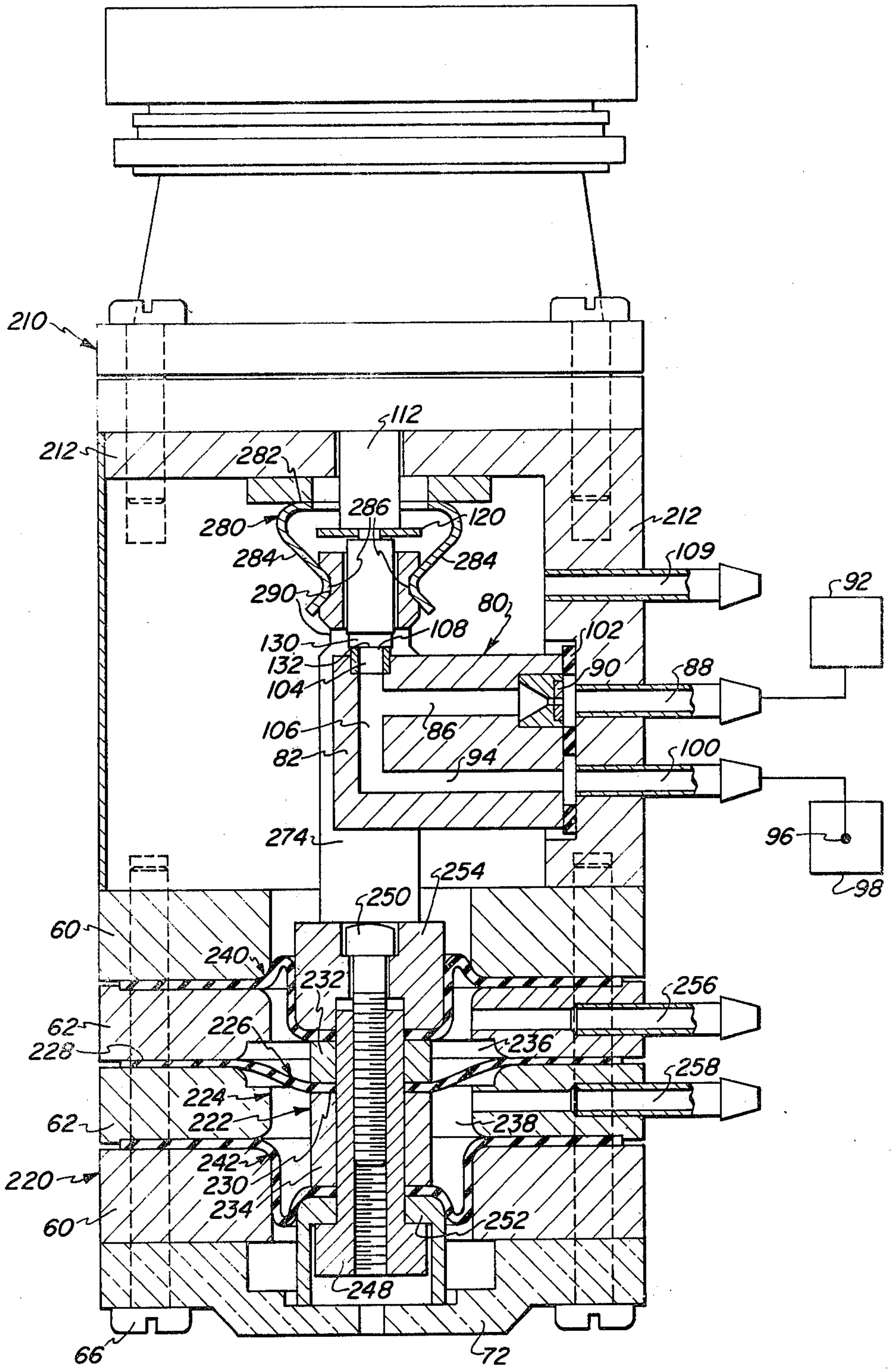
FIG. 6 is a front elevational view similar to FIG. 1, but illustrating another timing device constructed in accordance with the invention.
Figure 7:
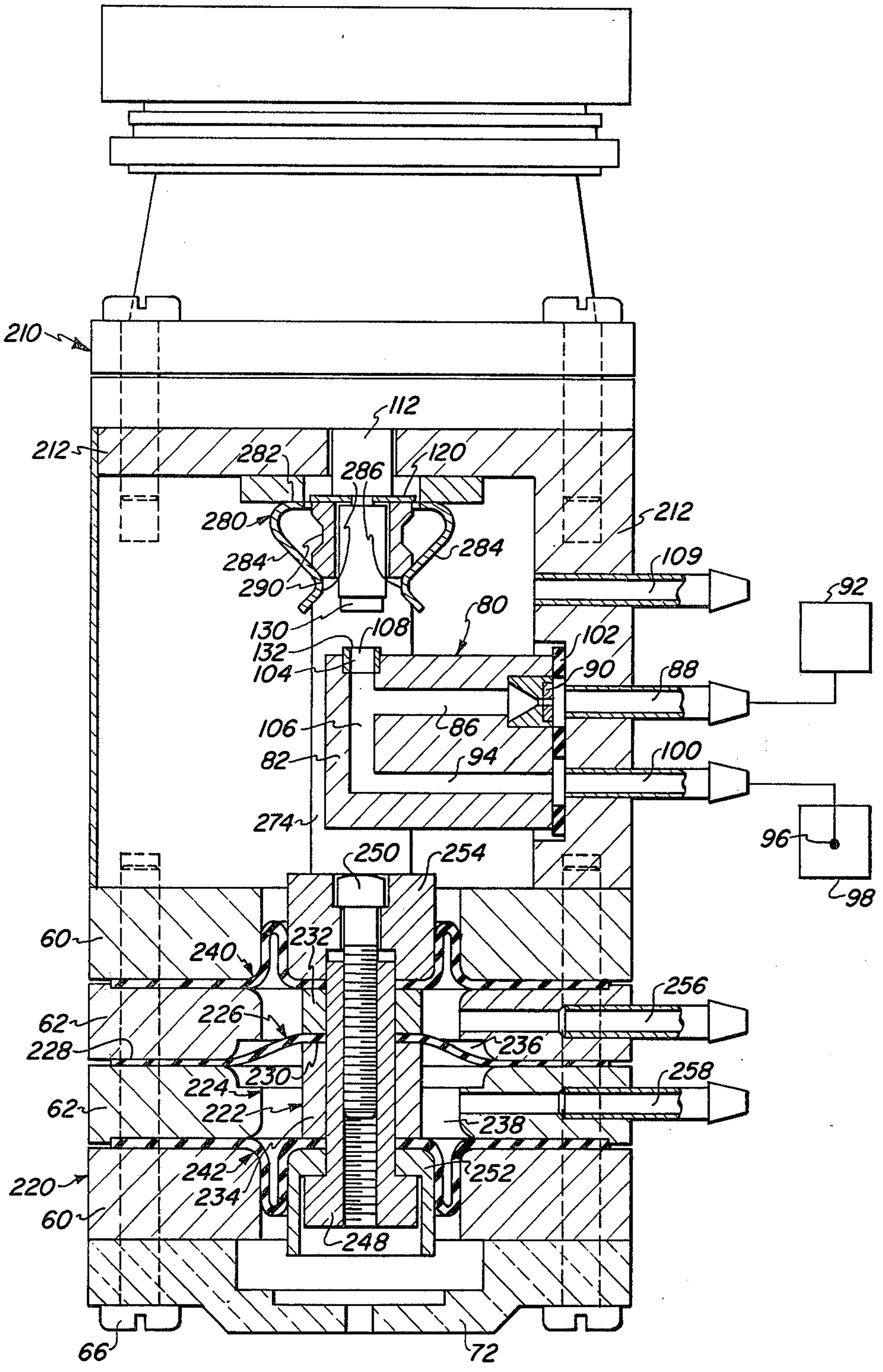
FIG. 7 is a front elevational view similar to FIG. 6, but with the component parts of the timing device in another operating position.

Referring now to FIGS. 6 and 7, an alternate arrangement is illustrated for enabling the timing device to be actuated in response to a short-term activating pulse, as opposed to the long-term actuating forces required in the embodiments illustrated in FIGS. 1 through 5.

In the device illustrated in FIGS. 1 through 4, working fluid admitted through inlet port 76 to chamber 24 to move piston 22 downwardly must remain in chamber 24 to retain piston 22 in the lowermost position, against the upward bias of spring 70. Not until after the expiration of the predetermined timed interval and operation of fluid switching device 80 is the working fluid released from chamber 24 to allow spring 70 to reset the device. Likewise, in the configuration of FIG. 5, a working fluid must be present in the chamber 24 to maintain the piston 22 in the uppermost position against the bias of spring 70. In both instances, the forces provided by the working fluid are long-term activating forces.

In order to enable the timing device to respond to relatively short-term activating pulses, rather than the continuous, long-term activating forces described above, an alternate arrangement is provided. In the embodiment of FIGS. 6 and 7, timing device 210 has a frame 212 and is provided with a fluid actuator 220 in which a piston 222 moves upwardly and downwardly within a chamber 224 having a wall which now includes two segments 62 juxtaposed with one another. A seal in the form of intermediate diaphragm 226 has an outer portion 228 clamped between segments 62 and extends inwardly to an inner portion 230 clamped between upper and lower portions 232 and 234, respectively, of piston 222 so that chamber 224 is divided into upper and lower sub-chambers 236 and 238, respectively. Diaphragm 226 is slack and flexible between outer portion 228 and inner portion 230 so as to offer minimal resistance to the upward and downward movement of piston 222.

As in the earlier-described embodiments, diaphragms 240 and 242 are placed at the opposite ends of the chamber 224 and a sleeve nut 248 engages a bolt 250 to secure the piston portions 232 and 234, and the diaphragms 226, 240 and 242 between a lower retainer 252 and an upper retainer 254. An upper inlet port 256 is provided for admitting a working fluid to the upper sub-chamber 236 and a lower inlet port 258 is provided for admitting a working fluid to the lower sub-chamber 238.

Piston 222 is movable between a lower position, shown in FIG. 6, and an upper position, shown in FIG. 7. A slide 274 is integral with upper retainer 254 and moves upwardly and downwardly with piston 222. The slide 274, and piston 222, are retained in each of the lower and upper positions by resilient detent means having detent elements located on the frame 212 and on the slide 274 as follows. A spring member 280 has a base 282 from which there projects a pair of resiliently deflectable arms 284, each carrying a detent projection 286. The base 282 is secured to frame 212. The slide 274 is provided with a pair of detent notches 290 spaced apart axially a distance equivalent to the travel of the piston 222, each detent notch 290 being complementary to the detent projections 286.

Upon introducing working fluid into upper sub-chamber 236, through upper inlet port 256, piston 222 will be moved downwardly from the upper position to the lower postion by virtue of the fact that the total area of piston 222 and diaphragm 226 worked upon by the working fluid in sub-chamber 236 is greater than the total area of piston 222 and diaphragm 240 worked upon by the working fluid. Since the slide 274, and the piston 222, will be retained in the lower position by engagement of the detent projections 286 with the upper detent notch 290, as seen in FIG. 6, working fluid need not be maintained in the upper sub-chamber 236 in order for the timing device to complete its timing cycle. Thus, only a short-term activating pulse of working fluid is required to activate timing device 210 and enable the fluid switching device 80 of the timing device to be operated at the expiration of a predetermined timed interval following the activating pulse. Reset is achieved by introducing a working fluid into the lower sub-chamber 238, through lower inlet port 258, to move piston 222 upwardly to the upper position shown in FIG. 7, where the slide 274, and piston 222, are retained by engagement of the detent projections 286 with lower detent notch 290. Such upward movement results from the working fluid acting upon the total area of piston 222 and the intermediate portion of diaphragm 226, which is greater than the total area of piston 222 and the portion of diaphragm 242 worked upon by the working fluid in lower sub-chamber 238. Again, only a pulse is required since the piston and slide are retained at the upper position.

It is noted that the illustrated embodiments employ a fluid operated timing mechanism to actuate a fluid switching device in response to activation or deactivation of a fluid actuator. Since all of the components are operated by a fluid, or handle a fluid, no electrical devices are required. Thus, the timing devices are well-suited to installations where electrical components would introduce a hazard. Of course, where no hazard would exist, the fluid actuators each could be replaced with an electrical actuator such as a solenoid.

It is to be understood that the above detailed description of embodiments of the invention is provided by way of example only. Various details of design and construction may be modified without departing from the true spirit and scope of the invention, as set forth in the appended claims.

The embodiments of the invention in which an exclusive property or privilege is claimed are defined as follows:

1. In a timing device for providing a fluid signal at a given point upon the expiration of a prescribed timed interval following a given event, the timing device including a frame;

a motion transmitting member mounted in the frame for movement along a prescribed path of travel in either one of two directions between a first location and a second location; and timing means on the frame coupled with the motion transmitting member for effecting movement of the motion transmitting member at a predetermined rate in only one of said two directions to establish said timed interval between the departure of said motion transmitting member from the first location thereof and the arrival of the motion transmitting member at the second location, and permitting return movement of the motion transmitting member from the second location to the first location at an unresticted rate:

a fluid switching device on the frame, said switching device comprising an input passage for a fluid input;

an output passage communicating with the given point;

a control passage communicating with the input and output passages;

switching means on the frame for operation between a first condition wherein the control passage is effective to divert the fluid input provided at the input passage away from the output passage, and a second condition wherein the control passage enables the fluid input to be directed to the output passage, the switching means being responsive to the motion transmitting member for operation from one to the other of the first and second conditions upon the arrival of the motion transmitting member at the second location thereof to provide a fluid signal at the given point, and wherein the timing device further includes;

a fluid actuator having a fluid chamber including a chamber wall extending between sealed longitudinally opposite first and second ends, and a piston within the chamber spaced laterally from the chamber wall and movable longitudinally between a first position located adjacent the first end of the chamber and a second position located adjacent the second end of the chamber;

coupling means coupling the piston with the motion transmitting member such that the motion transmitting member is retained in the first location thereof when the piston is in the first position and the motion transmitting member is free to move toward the second location thereof, under the influence of the timing means, when the piston is in the second position;

resilient biasing means biasing the piston in a given direction toward one of the first and second positions and the respective one of the first and second ends of the chamber;

a diaphragm extending between the piston and the chamber wall at the end of the chamber opposite said one end toward which the piston is biased; and activating means for admitting a working fluid into the chamber upon activation of the fluid actuator to move the piston in a direction opposite to said given direction toward the other of said first and second positions against the bias of the resilient biasing means, and for releasing the working fluid from the chamber upon deactivation of the fluid actuator to enable return of the piston in response to the bias of the resilient biasing means;

the diaphragm including a longitudinally extending salient-shaped flexible portion between the piston and the chamber wall whereby movement of the piston between the first and second positions thereof is accompanied by a rolling movement of the salient-shaped flexible portion of the diaphragm;

a further diaphragm extending between the piston and the chamber wall at said one end of the chamber, the further diaphragm having a longitudinally extending salient-shaped flexible portion between the piston and the chamber wall, whereby movement of the piston is accompanied by a rolling movement of the salient-shaped flexible portion of the further diaphragm, the total area of the piston and the first said diaphragm acted upon by the working fluid in the chamber being greater than the corresponding total area of the piston and the further diaphragm so that movement of the piston in response to the working fluid is in the direction opposite to said given direction; and means for selectively reversing the given direction of the resilient biasing means; and means for selectively reversing the relative location of the diaphragms so as to reverse the direction of movement of the piston in response to the working fluid in the chamber, whereby the motion transmitting member is free to move from the first location toward the second location thereof selectively in response to activation and deactivation of the fluid actuator.

2. The invention of claim 1 wherein:

the chamber includes a first lateral cross-sectional area adjacent said one end thereof and a second lateral cross-sectional area adjacent the other end thereof, the first lateral cross-sectional area being different from the second lateral cross-sectional area; and the means for selectively reversing the relative location of the diaphragms includes means for selectively reversing the relative location of the first and second lateral cross-sectional areas.

3. The invention of claim 2 wherein the chamber wall is comprised of modular segments aligned longitudinally in a given arrangement, and the means for selectively reversing the locations of the diaphragms includes means for selectively changing the arrangement of the modular segments.

4. The invention of claim 2 wherein:

the piston includes first and second portions spaced apart longitudinally and having different lateral cross-sectional areas, each piston portion being located at a respective end of the chamber, and the means for selectively reversing the relative location of the diaphragms includes means for selectively reversing the relative location of the first and second piston portions.

5. The invention of claim 4 wherein the first and second portions of the piston are integral and the means for selectively reversing the relative location of the first and second piston portions includes means for selectively coupling the piston with the motion transmitting member in either one of two different orientations of the piston relative to the motion transmitting member.

6. The invention of claim 4 wherein the resilient biasing means is a spring, and the means for selectively reversing the given direction of the resilient biasing means includes means for selectively relocating the spring.

7. In a timing device for providing a fluid signal at a given point upon the expiration of a prescribed timed interval following a given event, the timing device including a frame;

a motion transmitting member mounted in the frame for movement along a prescribed path of travel in either one of two directions between a first location and a second location; and timing means on the frame coupled with the motion transmitting member for effecting movement of the motion transmitting member at a predetermined rate in only one of said two directions to establish said timed interval between the departure of said motion transmitting member from the first location thereof and the arrival of the motion transmitting member at the second location, and permitting return movement of the motion transmitting member from the second location to the first location at an unrestricted rate:

a fluid switching device on the frame, said switching device comprising an input passage for a fluid input;

an output passage communicating with the given point;

a control passage communicating with the input and output passages;

switching means on the frame for operation between a first condition wherein the control passage is effective to divert the fluid input provided at the input passage away from the output passage, and a second condition wherein the control passage enables the fluid input to be directed to the output passage, the switching means being responsive to the motion transmitting member for operation from one to the other of the first and second conditions upon the arrival of the motion transmitting member at the second location thereof to provide a fluid signal at the given point;

wherein the timing device includes:

an actuator having actuating means movable between a first position and a second position;

coupling means coupling the actuating means with the motion transmitting member such that the motion transmitting member is retained in the first location thereof when the actuating means is in the first position and the motion transmitting member is free to move toward the second location thereof, under the influence of the timing means, when the actuating means is in the second position;

resilient detent means for retaining the actuating means with a predetermined retention force at the first and second positions thereof upon placement of the actuating means at either of the first and second positions; and activating means for enabling movement of the actuating means from one of the first and second positions to the other of the first and second positions by overcoming the predetermined retention force of the resilient detent means in response to activation of the actuator.

8. The invention of claim 7 wherein:

the actuator is a fluid actuator having a fluid chamber including a chamber wall extending between sealed longitudinally opposite first and second ends, and a piston within the chamber spaced laterally from the chamber walls and movable longitudinally between a first position located adjacent the first end of the chamber and a second position located adjacent the second end of the chamber;

the coupling means includes a slide moved by the piston and coupled with the motion transmitting member;

the resilient detent means includes complementary detent elements on the frame and on the slide; and the activating means includes:

an end diaphragm extending between the piston and the chamber wall at one end of the chamber, the end diaphragm including a longitudinally extending salient-shaped flexible portion between the piston and the chamber wall whereby movement of the piston between the first and second positions thereof is accompanied by a rolling movement of the salient-shaped flexible portion of the diaphragm; and a seal between the piston and the chamber wall located longitudinally between the opposite ends of the chamber to divide the chamber into first and second sub-chambers; and the activating means includes a first port for admitting a working fluid into the first sub-chamber and a second port for admitting a working fluid into the second sub-chamber.

9. The invention of claim 8 including a further end diaphragm extending between the piston and the chamber wall at the other end of the chamber, the further end diaphragm having a longitudinally extending salient-shaped flexible portion between the piston and the chamber wall, whereby movement of the piston is accompanied by a rolling movement of the salient-shaped flexible portion of the further end diaphragm.

10. The invention of claim 9 wherein the seal comprises a flexible intermediate diaphragm extending between the piston and the chamber wall intermediate the end diaphragms, the total area of the piston and the intermediate diaphragm acted upon by the working fluid in either sub-chamber being different from the total area of the piston and the end diaphragm acted upon by the working fluid in either sub-chamber such that the admission of working fluid into one of the sub-chambers will move the piston from the first position to the second position and the admission of working fluid into the other of the sub-chambers will move the piston from the second position to the first position.

11. The invention of claim 10 wherein said total area of the piston and the intermediate diaphragm is greater than said total area of the piston and each end disphragm.

12. In a timing device having a frame;

a motion transmitting member mounted in the frame for movement along a prescribed path of travel in either one of two directions between a first location and a second location; and timing means on the frame coupled with the motion transmitting member for effecting movement of the motion transmitting member at a predetermined rate in one only of said two directions to establish said timed interval between the departure of said motion transmitting member from the first location thereof and the arrival of the motion transmitting member at the second location, and permitting return movement of the motion transmitting member from the second location to the first location at an unrestricted rate:

a fluid actuator having a fluid chamber including a chamber wall extending between sealed longitudinally opposite first and second ends, and a piston within the chamber spaced laterally from the chamber wall and movable longitudinally between a first position located adjacent the first end of the chamber and a second position located adjacent the second end of the chamber;

coupling means coupling the piston with the motion transmitting member such that the motion transmitting member is retained in the first location thereof when the piston is in the first position and the motion transmitting member is free to move toward the second location thereof, under the influence of the timing means, when the piston is in the second position;

resilient biasing means biasing the piston in a given direction toward one of the first and second positions and the respective one of the first and second ends of the chamber;

a diaphragm extending between the piston and the chamber wall at the end of the chamber opposite said one end toward which the piston is biased; and activating means for admitting a working fluid into the chamber upon activation of the fluid actuator to move the piston in a direction opposite to said given direction toward the other of said first and second positions against the bias of the resilient biasing means, and for releasing the working fluid from the chamber upon deactivation of the fluid actuator to enable return of the piston in response to the bias of the resilient biasing means;

the diaphragm including a longitudinally extending salient-shaped flexible portion between the piston and the chamber wall whereby movement of the piston between the first and second positions thereof is accompanied by a rolling movement of the salient-shaped flexible portion of the diaphragm, and wherein the timing device includes:

a further diaphragm extending between the piston and the chamber wall at said one end of the chamber, the further diaphragm having a longitudinally extending salient-shaped flexible portion between the piston and the chamber wall, whereby movement of the piston is accompanied by a rolling movement of the salient-shaped flexible portion of the further diaphragm, the total area of the piston and the first said diaphragm acted upon by the working fluid in the chamber being greater than the corresponding total area of the piston and the further diaphragm so that movement of the piston in response to the working fluid is in the direction opposite to said given direction; and means for selectively reversing the relative direction of the resilient biasing means; and means for selectively reversing the relative location of the diaphragms so as to reverse the direction of movement of the piston in response to the working fluid in the chamber, whereby the motion transmitting member is free to move from the first location toward the second location thereof selectively in response to activation and deactivation of the fluid actuator.

13. The invention of claim 12 wherein:

the chamber includes a first lateral cross-sectional area adjacent said one end thereof and a second lateral cross-sectional area adjacent the other end thereof, the first lateral cross-sectional area being different from the second lateral cross-sectional area; and the means for selectively reversing the relative location of the diaphragms includes means for selectively reversing the relative location of the first and second lateral cross-sectional areas.

14. The invention of claim 13 wherein the chamber wall is comprised of modular segments aligned longitudinally in a given arrangement, and the means for selectively reversing the locations of the diaphragms includes means for selectively changing the arrangement of the modular segments.

15. The invention of claim 13 wherein:

the piston includes first and second portions spaced apart longitudinally and having different lateral cross-sectional areas, each piston portion being located at a respective end of the chamber, and the means for selectively reversing the relative location of the diaphragms includes means for selectively reversing the relative location of the first and second piston portions.

16. The invention of claim 15 wherein the first and second portions of the piston are integral and the means for selectively reversing the relative location of the first and second piston portions includes means for selectively coupling the piston with the motion transmitting member in either one of two different orientations of the piston relative to the motion transmitting member.

17. The invention of claim 15 wherein the resilient biasing means is a spring, and the means for selectively reversing the given direction of the resilient biasing means includes means for selectively relocating the spring.

18. In a timing device having a frame;

a motion transmitting member mounted in the frame for movement along a prescribed path of travel in either one of two directions between a first location and a second location; and timing means on the frame coupled with the motion transmitting member for effecting movement of the motion transmitting member at a predetermined rate in one only of said two directions to establish said timed interval between the departure of said motion transmitting member from the first location thereof and the arrival of the motion transmitting member at the second locations, and permitting return movement of the motion transmitting member from the second location to the first location at an unrestricted rate:

an actuator having actuating means movable between a first position and a second position;

coupling means coupling the actuating means with the motion transmitting member such that the motion transmitting member is retained in the first location thereof when the actuating means is in the first position and the motion transmitting member is free to move toward the second location thereof, under the influence of the timing means, when the actuating means is in the second position;

resilient detent means for retaining the actuating means with a predetermined retention force at the first and second positions thereof upon placement of the actuating means at either of the first and second positions; and activating means for enabling movement of the actuating means from one of the first and second positions to the other of the first and second positions by overcoming the predetermined retention force of the resilient detent means in response to activation of the actuator.

19. The invention of claim 18 wherein:

the actuator is a fluid actuator and has a piston movable within a chamber having opposite ends, said actuating means including an actuator member moved by the piston between said first position and said second position;

said coupling means couples the actuator member with the motion transmitting member;

the resilient detent means includes complementary detent elements on the frame and on the actuator member; and said activating means includes a first port located adjacent one end of the chamber for admitting a working fluid into the chamber to move the piston so as to urge the actuator member from the first position to the second position, and a second port located adjacent the other end of the chamber for admitting a working fluid into the chamber to move the piston so as to urge the actuator member from the second position to the first position.

20. The invention of claim 18 wherein:

the actuator is a fluid actuator having a fluid chamber including a chamber wall extending between sealed longitudinally opposite first and second ends, and a piston within the chamber spaced laterally from the chamber walls and movable longitudinally between a first position located adjacent the first end of the chamber and a second position located adjacent the second end of the chamber;

the coupling means includes a slide moved by the piston and coupled with the motion transmitting member;

the resilient detent means includes complementary detent elements on the frame and on the slide; and the activating means includes:

an end diaphragm extending between the piston and the chamber wall at one end of the chamber, the end diaphragm including a longitudinally extending salient-shaped flexible portion between the piston and the chamber wall whereby movement of the piston between the first and second positions thereof is accompanied by a rolling movement of the salient-shaped flexible portion of the diaphragm; and a seal between the piston and the chamber wall located longitudinally between the opposite ends of the chamber to divide the chamber into first and second sub-chambers; and the activating means includes a first port for admitting a working fluid into the first sub-chamber and a second port for admitting a working fluid into the second sub-chamber.

21. The invention of claim 20 including a further end diaphragm extending between the piston and the chamber wall at the other end of the chamber, the further end diaphragm having a longitudinally extending salient-shaped flexible portion between the piston and the chamber wall, whereby movement of the piston is accompanied by a rolling movement of the salient-shaped flexible portion of the further end diaphragm.

22. The invention of claim 21 wherein the seal comprises a flexible intermediate diaphragm extending between the piston and the chamber wall intermediate the end diaphragms, the total area of the piston and the intermediate diaphragm acted upon by the working fluid in either sub-chamber being different from the total area of the piston and the end diaphragm acted upon by the working fluid in either sub-chamber such that the admission of working fluid into one of the sub-chambers will move the piston from the first position to the second position and the admission of working fluid into the other of the sub-chambers will move the piston from the second position to the first position.

23. The invention of claim 22 wherein said total area of the piston and the intermediate diaphragm is greater than said total area of the piston and each end diaphragm.

24. In a timing device of a type having a frame for providing a fluid signal at a given point upon the expiration of a prescribed timed interval, including:

a motion transmitting member mounted in the frame for movement along a prescribed path of travel in either one of two directions between a first location and a second location;

timing means on the frame coupled with the motion transmitting member for effecting movement of said motion transmitting member at a predetermined rate in one of said two directions to establish said timed interval between the departure of said motion transmitting member from the first location thereof and the arrival of the motion transmitting member at the second location thereof;

a switching device mounted on the frame so as to be stationary with respect to the movement of the motion transmitting member, said switching device comprising an input passage for a first fluid input;

an output passage communicating with the given point;

a control passage communicating with the input and output passages;

switching means carried by the motion transmitting member for linear movement therewith between a first condition wherein the control passage is effective to divert the fluid input provided at the input passage away from the output passage, and a second condition wherein the control passage enables the fluid input to be directed to the output passage, actuating means movable between a first position and a second position, said actuating means being responsive to a second fluid input independent of the first fluid input such that the second fluid input is isolated from the first input fluid communicating with the input passage of the switching device; and movable slide means coupled between the actuating means and the motion transmitting member such that the motion transmitting member is retained in the first location thereof when the actuating means is in the first position and the motion transmitting member is free to move linearly toward the second location thereof under the influence of the timing means when the actuating means is in the second position.

25. The invention of claim 24 wherein:

the control passage includes a control port; and the switching means is responsive to the motion transmitting member for maintaining the control port open when the switching means is in the first condition, and the motion transmitting member is in the first location thereof, and for closing off the control port so that the fluid input is switched to the output passage when the switching means is in the second condition, and the motion transmitting member arrives at the second location thereof.

26. The invention of claim 25 wherein the control port is a vent port.

27. The invention of claim 26 wherein the switching means includes a seal member carried by the motion transmitting member between a first position located away from the vent port when the motion transmitting member is at the first location, and a second position located at the vent port when the motion transmitting member is at the second location, the seal member closing the vent port at the second position.

28. The invention of claim 27 wherein the vent port is located on the linear path of travel at the second position.

29. The timing device of claim 24, wherein the slide means has a first end for engaging the motion transmitting member in the region thereof adjacent the switch means and a second end, the second end of said slide means being coupled to the actuator means such that the fastener extends longitudinally therefrom.

30. The timing device of claim 29, wherein the motion transmitting member includes a remote end portion having a first collar means on the motion transmitting member such that the first end of the slide means is adapted to engage the collar means when the actuating means is in said first position.

31. The timing device of claim 30, wherein said slide means is adapted to move linearly with respect to said motion transmitting member to effect said abutting engagement.

32. The timing device of claim 31, wherein the motion transmitting member is retained in the first location by virtue of the engagement of the first end of the slide means with the first collar means, the motion transmitting member being free to linearly move to the second location by a disengagement of the first end of the slide means with the first collar means.

33. The timing device of claim 29 wherein the slide means comprises an intermediate portion formed between the first and second ends thereof, said intermediate portion being juxtaposed relative to said switching device, said motion transmitting member being disposed on one side of said switching device and said actuator means being disposed on another opposed side of said switching device.

34. The timing device of claim 33, wherein the motion transmitting member comprises a cylindrically shaped spindle.

35. The timing device of claim 24, wherein the actuator means comprises a fluid chamber including a chamber wall extending between sealed longitudinally opposite first and second ends, the actuating means being within the chamber spaced laterally from the chamber wall and movable longitudinally between a first position located adjacent the first end of the chamber and a second position located adjacent the second end of the chamber; a first diaphragm extending between the actuating means and the chamber wall at the end of the chamber opposite said one end toward which the actuating means is biased; and a second diaphragm extending between the actuating means and the chamber wall at said one end of the chamber, the total area of the actuating means and the first said diaphragm acted upon by the working fluid in the chamber being greater than the corresponding total area of the actuating means and the further diaphragm so that movement of the actuating means in response to the second fluid is in the direction opposite to said given direction.

36. The timing device of claim 35, further comprising means for selectively reversing the relative location of the first and second diaphragms so as to reverse the direction of movement of the actuating means in response to the second fluid in the chamber, whereby the motion transmitting member is free to move from the first location toward the second location thereof selectively in response to activation and deactivation of the fluid actuator.

37. The timing device of claim 36 further comprising resilient biasing means biasing the actuating means in a given direction toward one of the first and second positions and the respective one of the first and second ends of the chamber; and the activating means admitting the second fluid into the chamber upon activation of the fluid actuator to move the actuating means in a direction opposite to said given direction toward the other of said first and second positions against the bias of the resilient biasing means, and for releasing the second fluid from the chamber upon deactivation of the actuator to enable return of the actuating means in response to the bias of the resilient biasing means; and means for selectively reversing the given direction of the resilient biasing means.

38. In a timing device having:

a frame;

a motion transmitting member mounted in the frame for movement along a predescribed path of travel in either one or two directions between a first location and a second location; and timing means on the frame coupled with the motion transmitting member for effecting movement of the motion transmitting member at a predetermined rate in one of said two directions to establish said timed interval between the departure of said motion transmitting member from the first location thereof and the arrival of the motion transmitting member at the second location;

a fluid actuator having a fluid chamber including a chamber wall extending between sealed longitudinally opposite first and second ends, and a piston within the chamber spaced laterally from the chamber wall and movable longitudinally between a first position located adjacent the first end of the chamber and a second position located adjacent the second end of the chamber;

coupling means coupling the piston with the motion transmitting member such that the motion transmitting member is retained in the first location thereof when the piston is in the first position and the motion transmitting member is free to move toward the second location thereof, under the influence of the timing means, when the piston is in the second position;

resilient biasing means biasing the piston in a given direction toward one of the first and second positions and the respective one of the first and second ends of the chamber;

a first diaphragm extending between the piston and the chamber wall at the end of the chamber opposite said one end toward which the piston is biased;

activating means for admitting a working fluid into the chamber upon activation of the fluid actuator to move the piston in a direction opposite to said given direction toward the other of said first and second positions against the bias of the resilient biasing means, and for releasing the working fluid from the chamber upon deactivation of the fluid actuator to enable return of the piston in response to the bias of the resilient biasing means;

a second diaphragm extending between the piston and the chamber wall at said one end of the chamber, the total area of the piston and the first said diaphragm acted upon by the working fluid in the chamber being greater than the corresponding total area of the piston and the further diaphragm so that movement of the piston in response to the working fluid is in the direction opposite to said given direction; and means for selectively reversing the given direction of the resilient biasing means; and means for selectively reversing the relative location of the first and second diaphragms so as to reverse the direction of movement of the piston in response to the working fluid in the chamber, whereby the motion transmitting member is free to move from the first location toward the second location thereof selectively in response to activation and deactivation of the fluid actuator.

39. The invention of claim 38 including visible means movable with the piston and transparent means on the frame for enabling viewing of the visible means to determine visually the position of the piston.

40. The timing device of claim 38 further including:

a fluid switching device on the frame, said switching device comprising an input passage for a fluid input;

an output passage communicating with the given point;

a control passage communicating with the input and output passages; and switching means on the frame for operation between a first condition wherein the control passage is effective to divert the fluid input provided at the input passage away from the output passage, and a second condition wherein the control passage enables the fluid input to be directed to the input passage, the switching means being responsive to the motion transmitting member for operation from one to the other of the first and second conditions upon the arrival of the motion transmitting member of the second location thereof to provide a fluid signal at the given point.

41. The timing device of claim 40 wherein:

the first diaphragm includes a longitudinally extending salient-shaped flexible portion between the piston and the chamber wall whereby movement of the piston between the first and second positions thereof is accompanied by a rolling movement of the salient-shaped flexible portion of the first diaphragm, and the second diaphragm includes a longitudinally extending salient-shaped flexible portion between the piston and the chamber wall, whereby movement of the piston is accompanied by a rolling movement of the salient-shaped flexible portion of the second diaphragm.

* * * * *